US012715084B2

(12) United States Patent
Maurer et al.

(10) Patent No.: US 12,715,084 B2
(45) Date of Patent: Aug. 25, 2026

(54) CLAMPING OR GRIPPING DEVICE AND METHOD FOR GRIPPING OR CLAMPING A WORKPIECE

(71) Applicant: SMW-Autoblok Spannsysteme GmbH, Meckenbeuren (DE)

(72) Inventors: Eckhard Maurer, Oberteuringen (DE); Jürgen Marquart, Markdorf (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 331 days.

(21) Appl. No.: 18/413,261

(22) Filed: Jan. 16, 2024

(65) Prior Publication Data

US 2024/0278386 A1 Aug. 22, 2024

(30) Foreign Application Priority Data

Jan. 16, 2023 (EP) .................................... 23151706

(51) Int. Cl.
*B25B 1/18* (2006.01)
*B25B 1/02* (2006.01)
*B25B 1/10* (2006.01)

(52) U.S. Cl.
CPC .................. *B25B 1/18* (2013.01); *B25B 1/02* (2013.01); *B25B 1/106* (2013.01)

(58) Field of Classification Search
CPC .. B25B 1/18; B25B 1/10; B25B 1/106; B25B 1/109; B25B 1/101; B25B 1/102
See application file for complete search history.

(56) References Cited

U.S. PATENT DOCUMENTS

2001/0027693 A1* 10/2001 Blaurock ............ F16H 25/2427 74/424.75
2012/0119451 A1 5/2012 Hangleiter et al.
2016/0158848 A1 6/2016 Maurer

FOREIGN PATENT DOCUMENTS

EP 2548681 1/2013
EP 2548681 A1 * 1/2013 ........... B23Q 17/005
EP 3059036 8/2016
EP 3175942 6/2017

* cited by examiner

*Primary Examiner* — Tyrone V Hall, Jr.
(74) *Attorney, Agent, or Firm* — Collard & Roe, P.C.

(57) ABSTRACT

With electrically operated clamping or gripping devices such as vices, it is necessary to switch them off after clamping the workpiece in order to prevent overheating. Machining by means of a machining robot, for example, is able to commence only once a safe torque off signal is present. However, the workpiece can become loose due to vibrations during such machining, since the de-energized electric motor can no longer perform retightening. This can lead to damage to the workpiece and, in the worst case, injuries to operating personnel. It is therefore the object of the invention to propose a solution for enabling retightening to be performed from an energy accumulator.
This is achieved in that the drive shaft of the motor can be extended via a threaded spindle, thereby preloading the energy accumulator. This makes effective retightening of the clamping or gripping device possible, particularly when using a steep-threaded spindle.

13 Claims, 4 Drawing Sheets

CLAMPING OR GRIPPING DEVICE AND METHOD FOR GRIPPING OR CLAMPING A WORKPIECE

REFERENCE TO PENDING PRIOR PATENT APPLICATION

This patent application claims benefit of European Patent Application No. 23151706.1, filed Jan. 16, 2023, which patent application is hereby incorporated herein by reference.

FIELD OF THE INVENTION

The present invention relates to a clamping or gripping device with at least one clamping or gripping means operated by means of an electric power clamp, the power clamp having an electric motor with a drive shaft, force transmission means for connecting the drive shaft to the at least one clamping or gripping means, and an energy accumulator for preloading the at least one clamping or gripping means, the drive shaft having a bearing sleeve between the electric motor and the force transmission means relative to which the electric motor is mounted so as to be displaceable in the axial direction against a restoring force of the energy accumulator by means of a threaded spindle that is guided in a threaded sleeve, the restoring force of the energy accumulator being greater than the propulsive force that is required to advance the clamping or gripping means, as well as to a corresponding method for gripping or clamping a workpiece using an electric power clamp.

BACKGROUND OF THE INVENTION

Such a clamping or gripping device is already known from EP 2 548 681. Moreover, reference should be made to the documents US 2016/158848 A1, US 2012/119451 A1, and EP 3 175 942 A1.

A chuck with electric motors is already known from EP 3 059 036 A1. It is described there that such a chuck can comprise a plurality of clamping jaws that hold a tool on multiple sides and support it during machining by means of a machining robot, for example. A provision is also made here that each of the clamping jaws can be associated with an energy storage device that applies force to the clamping jaw in the event of the clamping jaw loosening as a result of vibrations during machining and provides an additional clamping force.

However, such energy storage devices are only able to react to loosening that might occur after the clamping or gripping device has been tightened. Retightening, though, is no longer possible.

With hydraulic clamping devices, the hydraulic accumulator is able to provide the required force for retightening; in contrast, when an electric motor is used, it must be disengaged after clamping. Further machining of the workpiece is able to commence only once a so-called safe torque off signal is generated. Therefore, unlike the hydraulic pressure that is still present in a hydraulic clamping device, the motor output is no longer available for retightening, nor is the purely mechanical elasticity of the workpiece is sufficient for this.

SUMMARY OF THE INVENTION

It is therefore the object of the invention to provide an electrically operated clamping or gripping device that can apply force to retighten the workpiece between the clamping or gripping means even after a safe torque-off signal has been generated.

This is achieved by a clamping or gripping device according to the features of independent device claim 1 as well as by a method for gripping or clamping a workpiece according to the features of independent process claim 12. Expedient embodiments of such a device or method can be found in the respective subsequent dependent claims.

A clamping or gripping device is provided which has at least one clamping or gripping means that is operated by means of an electric power clamp, the power clamp having an electric motor with a drive shaft, force transmission means for connecting the drive shaft to the at least one clamping or gripping means, and an energy accumulator for preloading the at least one clamping or gripping means. According to the invention, the clamping or gripping device is characterized in that the drive shaft between the electric motor and the force transmission means has a bearing sleeve relative to which the electric motor is mounted so as to be displaceable in the axial direction against a restoring force of the energy accumulator by means of a threaded spindle that is guided in a threaded sleeve, the restoring force of the energy accumulator being greater than a propulsive force that is required to advance the clamping or gripping means.

By virtue of this arrangement, the electric motor will actuate its drive shaft during operation, which transmits a driving force to the clamping or gripping means through the force transmission means. In the case of a vice, it is possible for clamping means to be actuated in this manner, whereas in other applications, such as gripper arms, robots, and the like, any configuration can be employed in principle in which at least one first clamping or gripping means is clamped against a second clamping or gripping means, or a single clamping or gripping device is clamped against a fixed bearing. It is also possible to arrange such clamping means in a chuck, enabling the clamping means to even be employed in greater numbers—i.e., two, four, or six clamping means —if they are arranged opposite one another in pairs. If the clamping means is operated on only one side—i.e., if no opposing clamping means is used but rather a chuck with an odd number of clamping means—a power clamp will operate only one clamping means, whereas with opposing clamping means a power clamp can operate two clamping means like in a vice.

Due to the fact that the energy accumulator initially ensures a frictional engagement between the threaded spindle and the threaded sleeve, the bearing sleeve that is arranged in the drive shaft rotates along with the electric motor during the advancement of the clamping or gripping means. Only when the clamping or gripping devices come into contact with a workpiece does the additional actuating force required become greater than the static friction force between the threaded spindle and the threaded sleeve, and the threaded spindle screws itself out of the threaded sleeve. Here, the force used by the motor, which must continue to rotate after reaching the stop, is introduced into the energy accumulator and tensions it.

If the workpiece is then machined and loosening occurs in the clamping or gripping device that would cause the threaded spindle to be turned back, the restoring force of the energy accumulator ensures that the spindle cannot turn back, with the ultimate result that the clamping or gripping device is retightened.

According to the invention, a provision is also made that the threaded spindle is embodied as a steep-threaded spindle that is guided in a steep-threaded sleeve. In contrast to conventional threaded spindles, such a steep-threaded spindle has an especially high pitch. The pitch refers to the distance that the spindle travels in the longitudinal direction while rotating once about its axis, i.e., the distance between two thread crests. In a specific embodiment, the thread of the steep-threaded spindle can have a pitch of from 10 mm to 80 mm, preferably 30 mm to 40 mm, most preferably 35 mm. Such a steep thread pitch means that even a slight rotation of the spindle results in a powerful loading of the energy accumulator, meaning that the energy accumulator can exert a great force on the force transmission means.

A provision can also be made that the threaded spindle is operatively connected to the electric motor and the threaded sleeve is accommodated in a rotationally fixed manner in the bearing sleeve. In principle, this is also possible the other way around, but this is the preferred embodiment. The threaded spindle thus extends the drive axle, and the bearing sleeve can be moved in the longitudinal direction relative to the threaded spindle. The threaded sleeve can be held in the bearing sleeve by frictional engagement, but it is advantageous to additionally secure the threaded sleeve to the bearing sleeve in a rotationally fixed manner, for example using grub screws, in order to thus enable greater force to be applied.

It is with particular advantage that the electric motor can also be braked in its end position. This prevents the electric motor from turning back due to the spring force of the energy accumulator. In addition, the force transmission means can advantageously comprise a gear mechanism which enables the construction to be adapted to an advantageous speed of the motor.

In a specific embodiment, at least one spring assembly consisting of at least one, preferably several, compression springs, preferably coil springs or gas springs, can be provided as an energy accumulator. These can be preferably arranged around the electric motor and mounted on spring pins in order to prevent lateral deflection under pressure. The electric motor can have a motor housing which is connected in a rotationally fixed manner to a motor plate, the energy accumulator being supported on the motor plate on the one hand and on the fixed motor bearing on the other hand. This creates a cage for the springs of the energy accumulator, so that when the motor housing is moved away from the bearing sleeve, the motor plate is moved onto the motor fixed bearing and the springs have no way of escaping. The spring pins can be attached to the motor plate but then strike the fixed motor bearing on only one side, enabling them to avoid the coupled force through the fixed motor bearing.

Furthermore, the at least one clamping or gripping means can be driven using a self-locking trapezoidal thread spindle or a ball screw. A self-locking spindle requires a greater static friction force to be overcome in order to be set in motion. This makes it even more difficult to loosen clamping or gripping devices that are driven by such a spindle.

Also provided is a method for gripping or clamping a workpiece with the aid of an electric power clamp which actuates at least one clamping means by means of an electric motor with a drive shaft, force transmission means for connecting the drive shaft to the at least one clamping or gripping means, and an energy accumulator for preloading the at least one clamping or gripping means. According to the invention, the method is characterized in that the drive shaft has a bearing sleeve between the electric motor and the force transmission means, and the electric motor, which continues to rotate after reaching a stop on the workpiece, is displaced in the axial direction, with the motor counteracting a restoring force by means of a threaded spindle that is provided within the bearing sleeve and guided in a threaded sleeve of the energy accumulator, which restoring force is greater than a propulsion force that is required for the propulsion of the clamping or gripping means.

The above-described invention will be explained below in greater detail with reference to an exemplary embodiment.

DETAILED DESCRIPTION OF THE PREFERRED EMBODIMENTS

Figure 1:
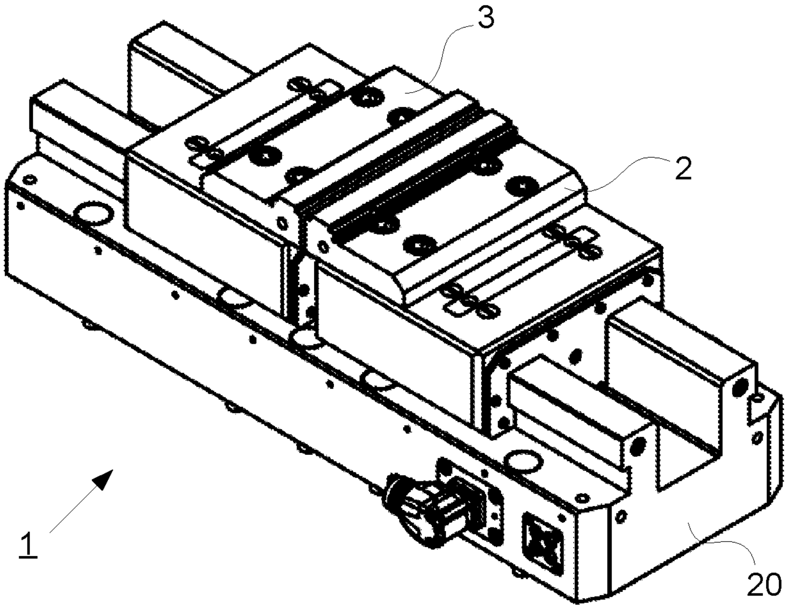
FIG. 1 shows a perspective view of a vise with a first and a second clamping means which is operated with an electric motor via a power clamp according to the invention.
Figure 2:
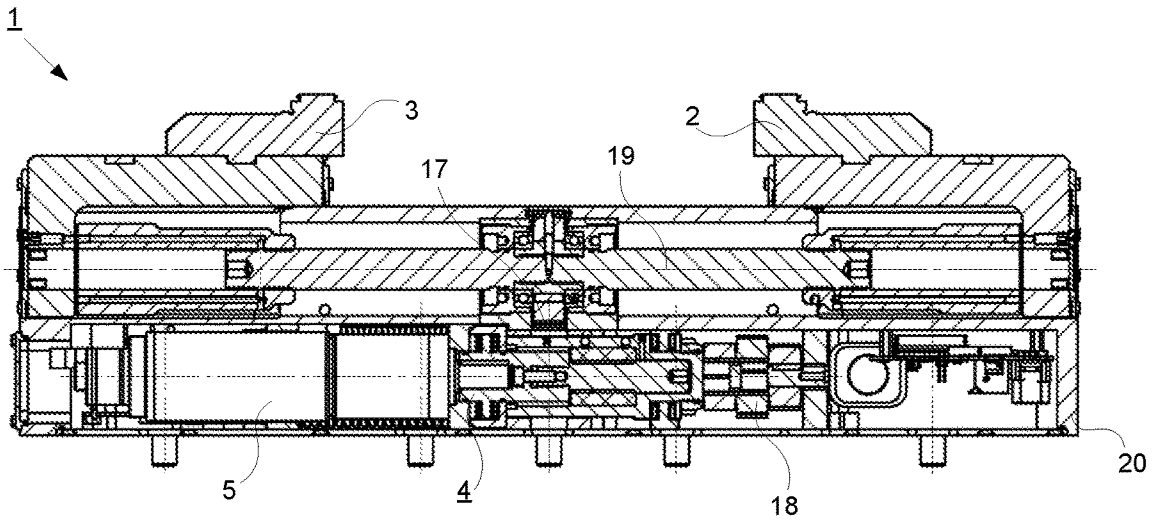
FIG. 2 shows the vice according to FIG. 1 in a side sectional view.

FIG. 1 shows a clamping device 1 in the form of a vice with a first clamping means 2 and a second clamping means 3 which are accommodated on a housing 20. The two clamping means 2 and 3 are guided in a longitudinally displaceable manner on the housing 20 and are operated in mirror symmetry to one another using a trapezoidal thread spindle 19, which is shown in the sectional view according to FIG. 2. FIG. 2 shows a lateral section through the clamping device 1, in the housing 20 of which the first clamping means 2 is connected to the second clamping means 3 via the trapezoidal thread spindle 19. The trapezoidal thread spindle 19 has threads extending in mirror symmetry from the center, so that, depending on the direction of rotation of the trapezoidal thread spindle 19, the clamping means 2 and 3 either move toward or away from one another. The trapezoidal thread spindle 19 also has a threaded section near its center which meshes with force transmission means 17 of the power clamp which is arranged beneath the clamping means 2 and 3. The force of an electric motor 5 of the power clamp 4 is ultimately transmitted to the trapezoidal thread spindle 19 and thus to the clamping means 2 and 3 via a thread 18.

Figure 3:
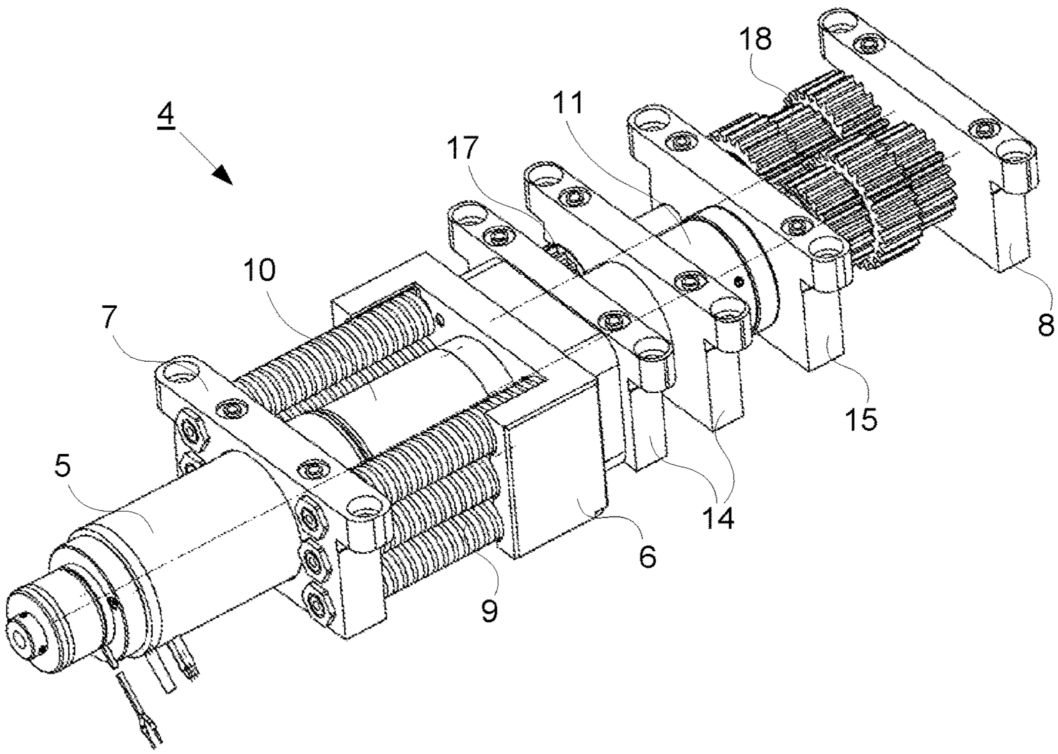
FIG. 3 shows the power clamp from the vice according to FIG. 2 in the untightened state in a perspective view.

FIG. 3 only illustrates the power clamp 4, which is shown from its underside. The electric motor 5 initially extends through a fixed motor bearing 7 and is displaceably mounted in this fixed motor bearing 7. A rotationally fixed and frictional connection is implemented in the electric motor 5 on the motor plate 6, which is situated opposite the fixed motor bearing 7. A spring assembly 9 is arranged as an energy accumulator between the motor plate 6 and the motor fixed bearing 7, which spring assembly 9 is formed in the present case from six spiral compression springs that are fixed with spring pins. The spring pins are attached to the motor plate 6 and, like the electric motor 5 itself, slidably mounted on the motor fixed bearing 7, the spring pins forming a stop which limits the greatest possible distance between the motor plate 6 and the motor fixed bearing 7.

Gear wheels are arranged as force transmission means 17 between two gear blocks 14, which gear wheels are operatively connected to the drive shaft 16 (not shown here) of the electric motor 5 via a gear mechanism 18 that is flanked by a bearing block 15 and a motor counter-bearing 8. A bearing sleeve 11, which is part of the drive shaft 16 of the electric motor 5, is guided through the gear blocks 14.

Figure 4:
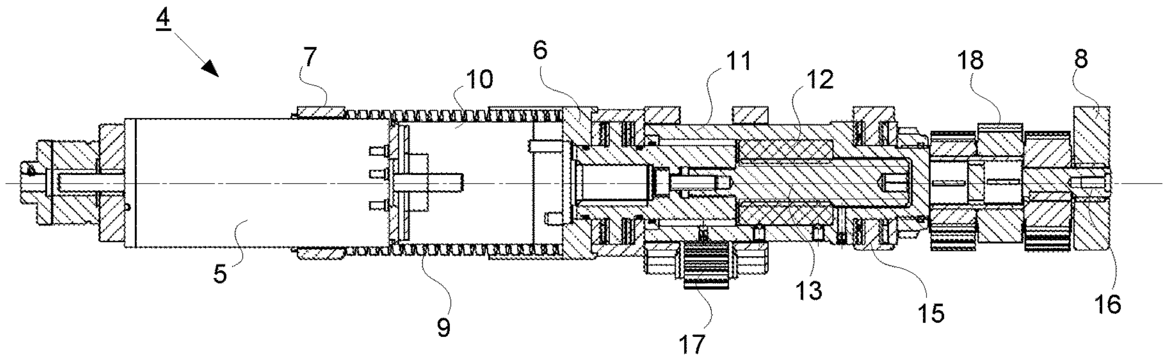
FIG. 4 shows the power clamp according to FIG. 3 in the untightened state in a side sectional view.

The bearing sleeve 11 represents a central functional element that is explained in greater detail in FIG. 4. In this sectional view, it can be seen that the electric motor 5 is connected beyond the motor plate 6 to a threaded spindle 13, which is accommodated in a corresponding threaded sleeve 12. Specifically, the threaded spindle 13 is a steep-threaded spindle with a pitch of 35 mm; the threaded sleeve 12 has a corresponding mating thread, enabling the threaded spindle 13 to be unscrewed from the threaded sleeve 12 by rotating relative thereto.

Such a relative movement between the threaded spindle 13 and the threaded sleeve 12 is initially prevented by friction. This is created by the preload of the spring assembly 9, which presses the electric motor 5 in the direction of its drive shaft 16. As long as the rotation of the electric motor 5 is able to effect a movement in the gear mechanism 18, a rotation of the force transmission means 17 and, ultimately, a movement of the clamping means 2 and 3, and the force for this is less than the frictional engagement between the threaded spindle 13 and the threaded sleeve 12 caused by the spring assembly 9, there is no relative movement between the threaded spindle 13 and the threaded sleeve 12. Only when the clamping means 2 and 3 come to a stop, for example when they grip a workpiece, does the force required for the actuation become greater than the frictional engagement, and the threaded spindle 13 begins to rotate in the threaded sleeve 12.

Figure 5:
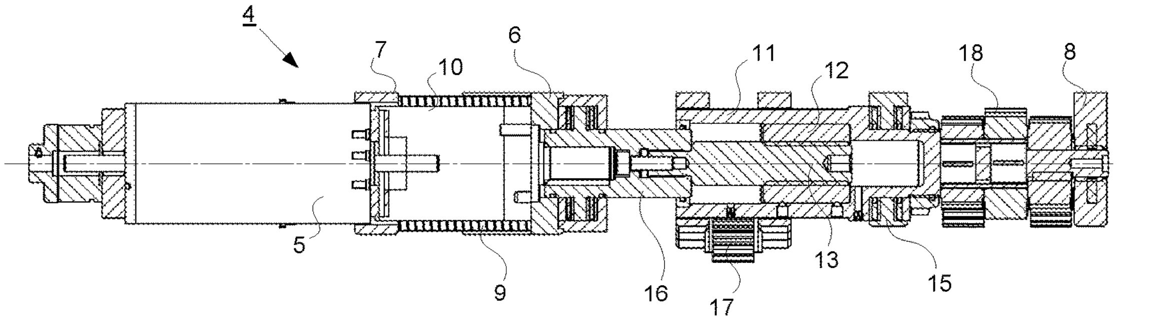
FIG. 5 shows the power clamp according to FIG. 3 in a tightened state in a side sectional view.
Figure 6:
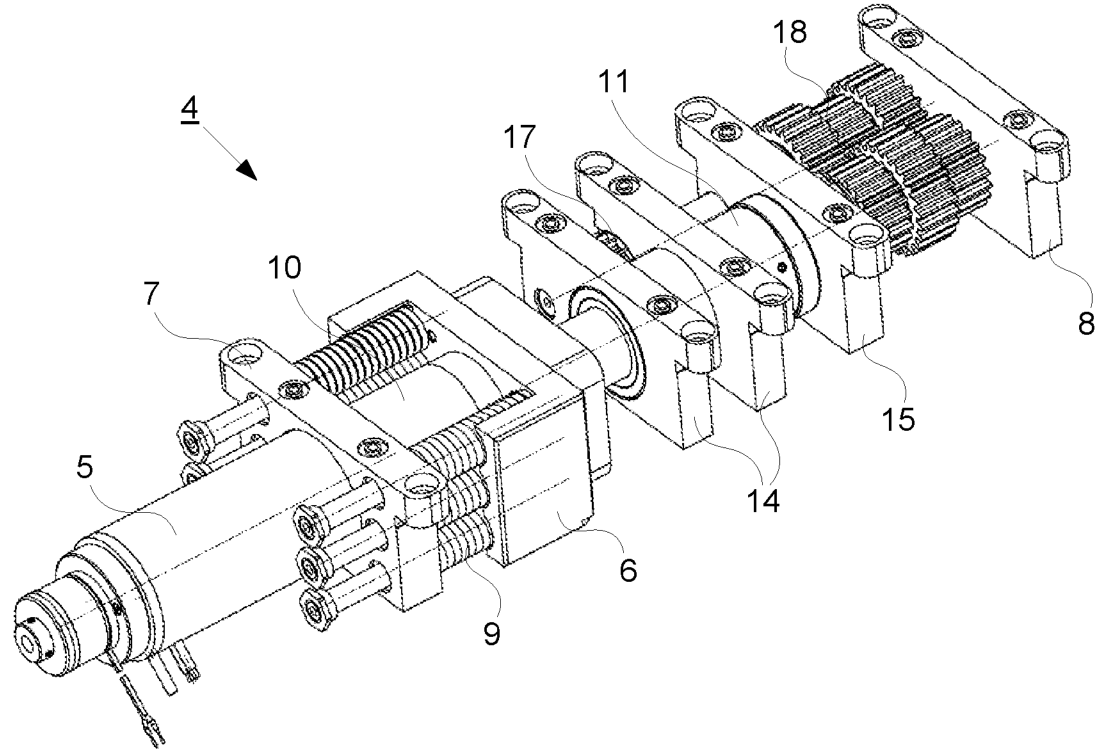
FIG. 6 shows the power clamp according to FIG. 3 in a tightened state in a perspective view.

This situation is shown in FIG. 5. There, the threaded spindle 13 has already been unscrewed from the threaded sleeve 12 by a certain distance, whereby the motor plate 6 has been pressed in the direction of the motor fixed bearing 7. This displacement requires pressure to be exerted on the spring assembly 9, causing the force required for this to be stored in the spring assembly. In this situation, which is also shown in perspective in FIG. 6, if the workpiece comes loose between the clamping means 2 and 3, the spring assembly 9 pushes forward and ensures that the threaded spindle 13 can only be turned back against the force of the spring assembly 9 and that any movements will be balanced out again as a result. It is especially advantageous if the thread of the threaded spindle 13 is embodied as a steep thread, so that even a slight rotation results in a strong spring force or, conversely, so that the spring can act on the threaded spindle 13 with a powerful force.

What is described above is an electrically operated clamping or grip ping device that can apply force to retighten the workpiece between the clamping or gripping means even after a safe torque off signal has been generated.

LIST OF REFERENCE SYMBOLS

1 clamping device
2 first clamping means
3 second clamping means
4 power clamp
5 electric motor
6 motor plate
7 motor fixed bearing
8 motor counter-bearing
9 spring assembly
10 motor housing
11 bearing sleeve
12 threaded sleeve
13 threaded spindle
14 gear blocks
15 bearing block
16 drive shaft
17 force transmission means
18 gear mechanism
19 trapezoidal thread spindle
20 housing

The invention claimed is:

1. A clamping or gripping device comprising:

at least one clamping or gripping means operated by means of an electric power clamp, wherein the power clamp comprises an electric motor comprising a drive shaft;

force transmission means for connecting the drive shaft to the at least one clamping or gripping means; and an energy accumulator for preloading the at least one clamping or gripping means;

wherein the drive shaft comprises a bearing sleeve between the electric motor and the force transmission means relative to which the electric motor is mounted so as to be displaceable in the axial direction against a restoring force of the energy accumulator by means of a threaded spindle that is guided in a threaded sleeve;

wherein the restoring force of the energy accumulator is greater than the propulsive force that is required to advance the clamping or gripping means; and wherein the threaded spindle is embodied as a steep-threaded spindle that is guided in a steep-threaded sleeve.

2. The clamping or gripping device according to claim 1, wherein the steep-threaded spindle comprises a thread with a pitch of from 10 mm to 80 mm.

3. The clamping or gripping device according to claim 1 wherein the threaded spindle is operatively connected to the electric motor, and the threaded sleeve is accommodated in a rotationally fixed manner in the bearing sleeve.

4. The clamping or gripping device according to claim 1, wherein the electric motor is braked in its end position.

5. The clamping or gripping device according to claim 1, wherein the force transmission means comprise a gear mechanism.

6. The clamping or gripping device according to claim 1, wherein at least one spring assembly consisting of at least one compression spring, is provided as the energy accumulator.

7. The clamping or gripping device according to claim 1, wherein the electric motor further comprises a motor housing which is connected in a rotationally fixed manner to a motor plate, wherein the energy accumulator is supported on the motor plate on the one hand and on the fixed motor bearing on the other hand.

8. The clamping or gripping device according to claim 1, wherein the at least one clamping or gripping means is driven using a self-locking trapezoidal thread spindle or a ball screw.

9. The clamping or gripping device according to claim 1, wherein the at least one clamping or gripping means can be clamped against a fixed bearing.

10. The clamping or gripping device according to claim 1, wherein the at least one clamping or gripping means comprises a first clamping or gripping means that can be clamped against a second adjustable clamping or gripping means.

11. The clamping or gripping device according to claim 1, wherein the at least one clamping or gripping means comprises multiple pairs of adjustable clamping or gripping means which are each arranged opposite one another in pairs.

12. A method for gripping or clamping a workpiece using an electric power clamp which actuates at least one clamping or gripping means by means of an electric motor comprising a drive shaft, force transmission means for connecting the drive shaft to the at least one clamping or gripping means, and an energy accumulator for preloading the at least one clamping or gripping means, wherein:

the drive shaft comprises a bearing sleeve between the electric motor and the force transmission means, and the electric motor, which continues to rotate after reaching a stop on the workpiece, is displaced in the axial direction;

the motor counteracts a restoring force by means of a threaded spindle that is provided within the bearing sleeve and guided in a threaded sleeve of the energy accumulator, which restoring force is greater than a propulsion force that is required for the propulsion of the clamping or gripping means; and the threaded spindle is a steep-threaded spindle, with long spring travel being generated by a small actuation.

13. The method according to claim 12, wherein the electric motor is de-energized after reaching an end position.

* * * * *